Figure 1:
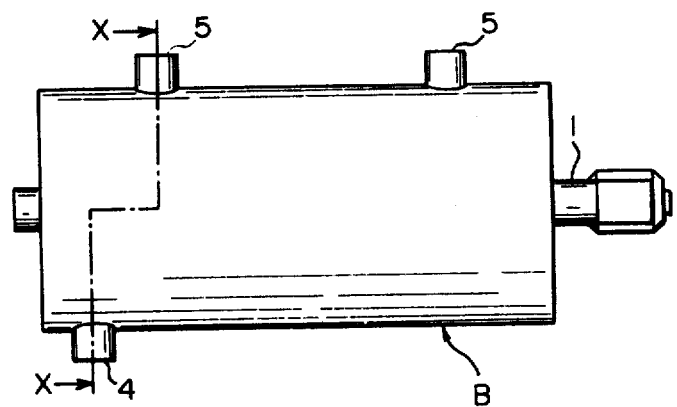

United States Patent [19]

Amemiya et al.

[11] 4,366,305

[45] Dec. 28, 1982

[54] PROCESS FOR HEAT STABILIZING OXYMETHYLENE COPOLYMERS

[75] Inventors: Akira Amemiya; Tadashi Kunii; Tomotaka Furusawa; Mutsuhiko Takeda; Katsumasa Tanaka; Toshikazu Umemura; Yoshihiro Ono; Isamu Masumoto; Noriyasu Nakao; Masanori Furukawa, all of Yokkaichi, Japan

[73] Assignee: Mitsubishi Gas Chemical Company, Inc., Tokyo, Japan

[21] Appl. No.: 322,249

[22] Filed: Nov. 17, 1981

[30] Foreign Application Priority Data

Nov. 20, 1980 [JP] Japan ............... 55-163686

[51] Int. Cl.³ ................................... C08G 2/28
[52] U.S. Cl. ................... 528/230; 525/398; 528/270; 528/480; 528/502; 528/503
[58] Field of Search ........... 528/230, 270, 480, 502, 528/503; 525/398

[56] References Cited

U.S. PATENT DOCUMENTS 4,301,273  11/1981  Sugio et al. ............ 528/230

Primary Examiner—Lucille M. Phynes
Attorney, Agent, or Firm—Wenderoth, Lind & Ponack

[57] ABSTRACT

In a process for producing a stabilized oxymethylene copolymer by heat-melting, at a temperature ranging between the melting point of the copolymer and a temperature 100° C. higher than the melting point in a degassing apparatus in the presence of a heat stabilizer, a crude oxymethylene copolymer of trioxane with a cyclic acetal or cyclic ether, to decompose and eliminate the instable portions of the copolymer, the improvement which comprises using as the degassing apparatus in heat stabilizing the crude oxymethylene copolymer a combination of (A) an extruder and (B) a surface renewing-type mixer, and carrying out the operation by first feeding a crude oxymethylene copolymer to said extruder (A) to heat-melt and decompose 30–90% by weight of the instable portions of the crude copolymer, removing the decomposed gas via a vent provided in said extruder, and thereafter introducing the molten resin continuously to said surface renewing-type mixer (B) where substantially all of the remaining instable portions of the oxymethylene copolymer are heat-decomposed until the content of the instable portions falls below about 2 wt. %, thereby heat stabilizing the copolymer; said extruder (A) having a single or a plurality of shafts, said surface renewing-type mixer functioning to mix and knead the resin thereby constantly renewing the surface of the resin to volatize the volatiles contained therein.

5 Claims, 5 Drawing Figures

PROCESS FOR HEAT STABILIZING OXYMETHYLENE COPOLYMERS

This invention relates to a process for heat stabilizing oxymethylene copolymers. It is known to produce an oxymethylene copolymer by copolymerizing trioxane with a cyclic ether and/or a cyclic acetal. The resulting crude oxymethylene copolymer as such, however, cannot become a serviceable resin for the reason that it has the group $-(OCH_2)_n OH$ at its molecular chain terminals, which terminals easily decompose on heating. As known methods of stabilizing this crude oxymethylene copolymer, there is a method of acetylating, etherifying or urethanizing the terminals of the copolymer, or a method of decomposing the copolymer until the oxyalkylene unit other than the oxymethylene unit, the constituent portion derived from the comonomer and contained in the molecular chain, forms a terminal, thus eliminating the instable portions.

This method of stabilization involving the decomposition of the terminals is advantageously employed for stabilizing the crude oxymethylene copolymer.

In view of the fact that, in the case of especially the method of decomposing and eliminating the instable portions by rendering the crude oxymethylene copolymer into a molten state (hereinafter to be referred to as the direct heat treatment method), a stabilized copolymer can be obtained directly without using a solvent, this method is most advantageous for commercial operations.

As such a direct heat treatment method, the use of a roller mill, a Laboplastomill or a vent-equipped Henschel mixer, or the formation of a film of the resin on a belt conveyor has been suggested in the past (see, for example, Japanese Patent Publication No. 8071/64), but these are all merely laboratory-scale techniques. It is also known to use a ZSK extruder marketed by Werner & Pfleiderer Engineers. In this method the resin is degassed by melt-blending it in the ZSK extruder which includes elliptical or quasitriangular paddles or screw blocks fixed to a shaft. On the other hand, another method is that of degassing the resin while melt-blending it in a ZDS extruder manufactured by the same company. This latter extruder includes a pair of intermeshing parallel screws which rotate in the same direction. In these methods which use a so-called extruder, a residence time of usually 5 to 60 minutes, preferably 20 to 40 minutes, is required for the decomposition and elimination of the instable portions to such an extent that desirable stability is obtained. Hence, this requires a large apparatus, with the consequence that the cost of operations becomes high to make their use unfavorable for commercial scale production.

Our extensive researches into the process for producing on a commercial scale an oxymethylene copolymer having a high thermal stability of practical value led to the discovery of a process by which stabilized oxymethylene copolymers can be produced commercially advantageously by the direct heat treatment method.

This invention is thus directed to a process for heat stabilizing a crude oxymethylene copolymer which comprises, in producing a stabilized oxymethylene copolymer by heat-melting a crude oxymethylene copolymer of trioxane with a cyclic acetal or cyclic ether at a temperature ranging between the melting point of the copolymer and a temperature 100° C. higher than the melting point in a degassing apparatus in the presence of a heat stabilizer to decompose and eliminate the instable portions of the copolymer, using as the degassing apparatus a combination of (A) an extruder and (B) a surface renewing-type mixer, and carrying out the operation by first feeding a crude oxymethylene copolymer to said extruder (A) to heat-melt and decompose 30–90% by weight of the instable portions of the crude copolymer, removing the decomposed gas via a vent provided in said extruder, and thereafter introducing the molten resin continuously to said surface renewing-type mixer (B) where the remaining instable portions of the oxymethylene copolymer are heat-decomposed until the content of the instable portions falls below about 2 wt.% thereby heat stabilizing the copolymer; said extruder (A) having a single or a plurality of shafts, said surface renewing-type mixer (B) comprising a casing having a jacket for a heating medium fitted about its periphery and, disposed inside said casing, at least two stirring shafts each fitted with a plurality of scraping blades, said scraping blades being fitted to the shafts in staggered relationship to ensure that the blades do not collide with one another when the shafts are rotated in the same or different directions, whereby said blades rotate while maintaining a slight clearance between their tips and inside surface of the casing and the surface of the other stirring shaft, or said scraping blades being fitted to the several shafts being so disposed as to be in the same plane right-angled to the axial direction and so that they rotate while maintaining a slight clearance between the tips of the blades and the inside surface of the casing and the surface of the other corresponding blade when said shafts are rotated in the same of different directions, whereby said surface renewing-type mixer functions to mix and knead the resin thereby constantly renewing the surface of the resin to volatize the volatiles contained therein.

It is possible to thermally stabilize the crude copolymer by directly charging it to a surface renewing-type mixer as in the aforesaid prior art technique, but the heat generated by shearing in the case of a surface renewing-type mixer is smaller than in the case of the so-called screw-type extruder. Hence, even though it is desired to thermally stabilize the crude copolymer powder in the surface renewing-type mixer, a major portion of the treatment in the mixer will be used for melting the copolymer. Further, since a rapid decomposition of the instable portions of the crude copolymer takes place at the time of its melting, clogging of the discharge opening with the resin occurs due to violent foaming of the copolymer to render the operation of the mixer impossible.

On the other hand, when only an extruder is used, difficulty is experienced in obtaining a sufficient residence time for achieving the stabilization of the copolymer. It is an object of this invention to overcome these drawbacks of the conventional methods and suggest a system for thermally stabilizing the oxymethylene copolymer that is favorable for commercial operations, as well as provide a process by which an oxymethylene copolymer of satisfactory quality can be obtained.

It has now been found that the use, as the degassing apparatus, of a combination of an extruder and a surface renewing-type mixer and the optimization of the decomposition ratios of the instable portions of the copolymer in each of these apparatuses, greatly affect the operational efficiency and the production of a product of superior quality.

In the first place, it is necessary to operate the extruder A so that the decomposition ratio ($D_M$ value) of the instable portions of the crude oxymethylene copolymer fall within the range of 30-90 wt.%. For achieving this value, it is necessary, as hereinafter fully described, to choose the size of the extruder (shaft diameters, number of shafts and L/D) in accordance with the feed amount of the copolymer, as well as optimize the temperature and the speed of rotation of the shafts.

The $D_M$ value (wt.%), as used herein, is a value representing the proportion of the instable portions decomposed at the extruder A to the decomposable instable portions contained in the crude oxymethylene copolymer. The $D_M$ value is calculated as follows:

$$D_M = \left(1 - \frac{W'}{W}\right) \times 100 \text{ (wt. \%)}$$

wherein

W' is the weight (g) after heating 2.0 g of a crude copolymer in a test tube at 220° C. for 60 minutes in a vacuum of 2-3 mm Hg, and W is the weight (g) after heating a sample (2.0 g), taken in a test tube from the coupling part between the extruder A and the mixer B, at 220° C. for 60 minutes in a vacuum of 2-3 mm Hg.

When the $D_M$ value is less than 30 wt.%, the operation of the following surface renewing-type mixer becomes difficult due to foaming of the copolymer. Further, since it becomes necessary to prolong the residence time of the oxymethylene copolymer in the surface renewing-type mixer to beyond 60 minutes for achieving the substantially complete decomposition and elimination of the remaining instable portions, there is rather a tendency of the copolymer becoming degraded as a result of cleavage of the main chain.

On the other hand, when the $D_M$ value exceeds 90 wt.%, a much larger apparatus is required relative to the amount of copolymer fed. Hence, this is not practical. Further, since it becomes necessary to carry out the heating and mixing more rapidly in the extruder A, an increase of the instable portions, a decline in molecular weight or discoloration of the copolymer takes place. Hence, a $D_M$ value in excess of 90 wt.% is also undesirable.

The extruder A is provided with one or more vents via which the decomposed gas is removed. The resin of which 30-90 wt.% of the instable portions have been decomposed is then conveyed to the surface renewing-type mixer A via the coupling part.

In the surface renewing-type mixer A, the remaining instable portions of the oxymethylene copolymer are decomposed until the content of the instable portions falls below about 2 wt.%, preferably below about 1 wt.%.

In accordance with this invention, it is necessary for obtaining oxymethylene copolymers of good quality that the copolymer be treated at a temperature ranging from the melting point of the oxymethylene copolymer to a temperature 100° C. higher than the melting point, as indicated hereinbefore. However, such factors as the surface renewing coefficient in the surface renewing-type mixer, the pressure inside the degassing apparatus system as a whole, the residence time and the distribution of the residence time are also important.

The average residence time $t_o$ of the crude oxymethylene copolymer in the degassing apparatus as a whole is suitably from 5 minutes to 60 minutes. It is preferred that the operation be carried out so that the ratio of the maximum residence time t to the average residence time $t_o$ in the degassing apparatus as a whole ($t/t_o$) is not greater than 3.0.

The residence time in the extruder A is usually from 0.5 minute to 2 minutes.

The surface renewing-type mixer B is preferably so operated that the surface renewing coefficient J is in the range of 1-50 cm²/cm³·min as calculated by the following equation.

$$J = \frac{N \times As}{H} \quad (1)$$

wherein

N is the speed of rotation of the shafts (rpm), As is the surface area of the surface renewing portion (cm²), and H is the amount of resin packed at the surface renewing portion (cm³).

Further, the degassing apparatus is preferably operated at a pressure ranging from 760 mm Hg to 0.1 mm Hg. When the degassing apparatus is operated under these conditions, the stabilization of the crude oxymethylene copolymers can be carried out with still better results.

An example of a degassing apparatus, i.e., a heat stabilizing apparatus, to be used in the present invention will now be described by reference to the accompanying drawings.

Figure 2:
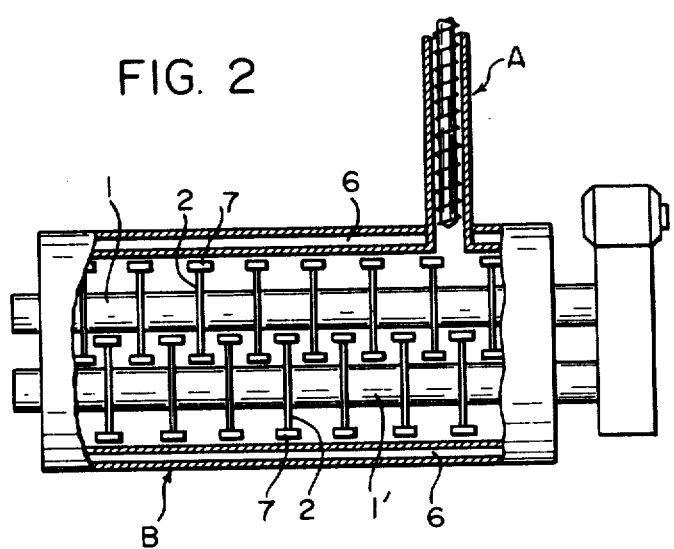
Figure 3:
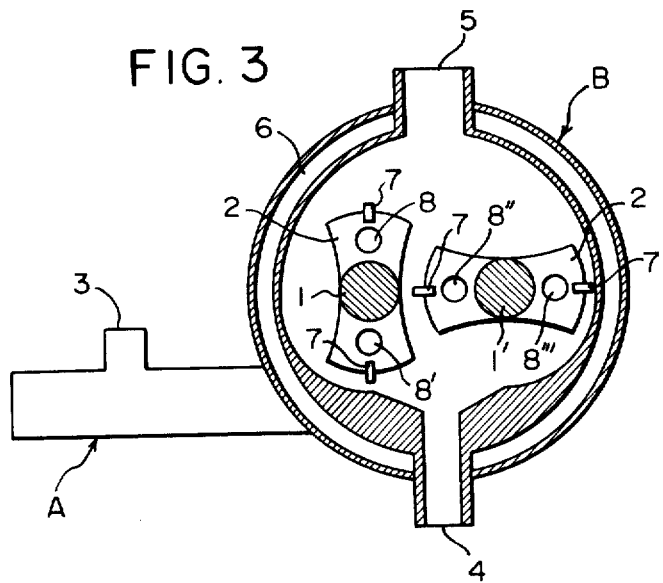

FIGS. 1 and 2 are a side elevation and a plan view, respectively, of an example of a degassing apparatus; and FIG. 3 is a cross-sectional view taken along line X—X in FIG. 1.

In FIG. 2 the degassing apparatus is made up by coupling a screw extruder A and a surface renewing-type mixer B. It must be understood however that the relative sizes of A and B are not necessarily shown as actually practiced. Further, it should be understood that various methods of connecting A and B are available.

The extruder A is an ordinary used extruder provided with a single or plurality of shafts. Included are not only those of the paddle-equipped type as in the case of the ZSK extruder marketed by Werner & Pfleiderer Engineers but also the double intermeshing screw-type extruder such as the ZDS extruder of the same company. A powder of a crude oxymethylene copolymer is heat-melted by the aforesaid extruder, and the molten resin is fed to the mixer via a coupling part. The decomposed gas resulting from the decomposition of the instable portions of the resin in the extruder is removed via a vent 3.

The surface renewing-type mixer B has a plurality of scraping blades 2 fitted to each of the two stirring shafts 1 and 1'. In FIGS. 2 and 3 the plurality of blades 2 are so disposed that they do not collide with one another when the stirring shafts 1 and 1' rotate, and whereby the blades rotate while maintaining a slight clearance between their tips and the inside surface of the casing and the surface of the other stirring shaft.

Inside the mixer B the resin, while being heated by means of the heating medium in the jacket 6, is mixed by the plurality of blades 2 in concomitance with the rotation of the stirring shafts 1 and 1' and, while its surface is being renewed, is conveyed to a discharge opening 4.

The decomposed gas that volatilized as a result of the surface renewal is discharged via the gas vent 5.

In FIG. 3 the scraping blades are provided with escape holes 8, 8', 8" and 8''' for the molten copolymer, and at their tips, auxiliary blades 7, for effectively carrying out the scraping of the inside surface of the casing.

Figure 4:
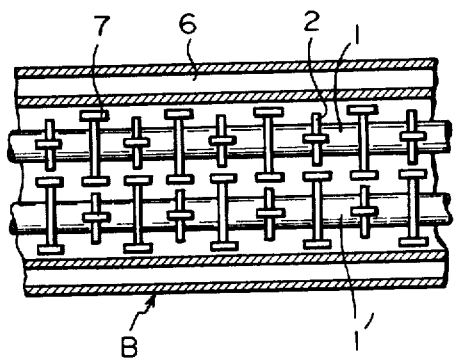
Figure 5A:
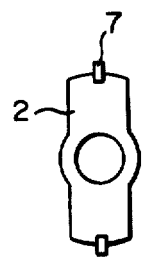
Figure 5B:
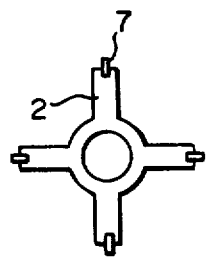
Figure 5C:
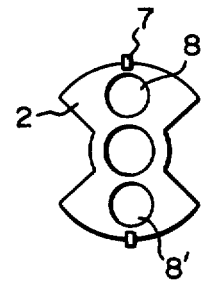
Figure 5D:
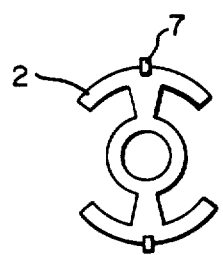
Figure 5E:
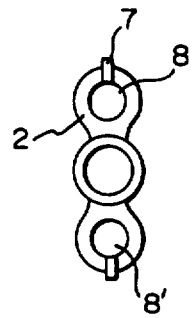

The relative positions in which the scraping blades are fitted to the stirring shafts 1 and 1' need not necessarily be as shown in FIG. 2 but may be, for example, as shown in FIG. 4. Thus, the scraping blades may be so fitted to the shafts that they rotate while maintaining a slight clearance between their tips and the inside surface of the casing and the other corresponding blade.

Further, the configuration of the scraping blade, in addition to that shown in FIG. 3, may also be as shown in FIGS. 5-(a), (b), (c), (d) and (e). The blades having the configurations shown in FIG. 5 are suitably used for mixing and surface renewal of high viscosity materials ranging from 2000 poises to 20,000 poises. It is preferred that the operation of the surface renewing-type mixer be carried out so that the molten resin does not completely fill the total effective volume inside the mixer but occupies only about one-half of the volume, thus maintaining at all times a space inside the mixer to ensure that the surface renewal action is effectively carried out. The control of the amount of polymer packed inside the surface renewing-type mixer B is achieved by regulating the balance between the flow rates at the extruder A mounted at the feed inlet of the surface renewing-type mixer and the withdrawal screw extruder (not shown) mounted at the discharge opening 4. The amount of polymer packed can be readily observed by the provision of an inspection window at the upper part of the surface renewing-type mixer.

The hold-up per unit shaft length of this surface renewing-type mixer is much greater than that of the extruder-type mixer, and hence the apparatus cost per unit of copolymer treated is much lower.

As indicated hereinbefore, for efficiently practicing the process of this invention it is preferred that the operation of the surface renewing-type mixer be so carried out that the surface renewing coefficient J falls within a prescribed range. It has been found that the aforementioned equation (1) for calculating the coefficient J can be approximated by the following equation (2).

$$J = \frac{nN\pi R^2}{4Hk} \quad (2)$$

wherein
J is the surface renewing coefficient (cm$^2$/cm$^3$·min),
N is the speed of rotation of the shafts (rpm),
n is the number of scraping blades,
R is the diameter of the circle described when the tips of the scraping blades rotate (cm),
H is the amount of polymer packed in the mixer (cm$^3$), and
k is a constant that is determined by the depth of the molten polymer.

The constant k, which varies depending upon the depth of the molten polymer, is a value from 1 to 3. When the depth of the molten polymer is one-half the depth of the surface renewing part, 2 is used.

As indicated hereinbefore, for the convenient practice of the method of this invention, it is preferred that the surface renewing-type mixer be operated so that the coefficient J obtained by the equation (1) falls within the range of 1–50 cm$^2$/cm$^3$·min. In view of the peculiar characteristics of the oxymethylene copolymers when subjected to heat, it is preferred that the surface renewing coefficient J be held to not greater than 50 cm$^2$/cm$^3$·min. On the other hand, when the coefficient J is less than 1 cm$^2$/cm$^3$·min, difficulty is experienced in obtaining serviceable heat stabilized products even though a suitable treatment temperature and residence time are employed. In addition, when the operation is carried out with the coefficient J less than 1 cm$^2$/cm$^3$·min, such troubles as the resin foaming in the vicinity of the openings of the mixer to clog the vents also tend to occur.

In the case of the surface renewing-type mixer B in accordance with this invention, the surface renewing coefficient J, as shown by the aforesaid equation (2), can be approximately determined by the number of stirring shafts, the size of the scraping blades, the number of blades and the amount of polymer packed in the reactor. The operation is usually carried out by using a mixer having 20–40 scraping blades, rotating the blades at 10–50 rpm, and packing the mixer to ⅓–¾ of its effective volume. These conditions are suitably combined to give a surface renewing coefficient J of 1–50 cm$^2$/cm$^3$·min.

On the other hand, the residence time distribution in the degassing apparatus can be measured by a reaction experiment using a tracer. Thus, a tracer innocuous to the reaction, such as carbon black, is used, and a small amount of this is fed to the feed inlet of the extruder A. The copolymer discharged from the discharge opening of the surface renewing-type mixer is collected hourly, and the concentration of the carbon black in this copolymer is measured with a color difference meter. The time that elapses until the concentration of the tracer added to the copolymer again becomes zero is the maximum residence time t. As indicated hereinbefore, the ratio of the maximum residence time t to the average residence time $t_o$ ($t/t_o$) is preferably not greater than 3.0. When there is a dead space inside the degassing apparatus and locally the residence time becomes abnormally long, cleavage of the main chain causes a broadening of the molecular weight distribution, with the consequence that there is a reduction in the thermal stability of the resulting oxymethylene copolymer.

The melting point of the oxymethylene copolymer can be determined by measuring its crystal melting initiation temperature with a differential scanning calorimeter (DSC). In this invention the crude oxymethylene copolymer used is usually one having a melting point ranging from 140° C. to 175° C. The heat treatment is carried out at a temperature ranging from this melting point to a temperature 100° C. higher than the melting point, preferably a temperature 20°–80° C. higher than the melting point. When the temperature used is lower than the melting point, complete decomposition of the instable portions of the copolymer cannot be achieved. On the other hand, when the temperature used is more than 100° C. higher than the melting point, the thermal stability of the resulting copolymer, rather than showing an improvement, becomes poor.

The oxymethylene copolymers to which the process of this invention is applied are those containing in the main chain 0.4–40 mole %, preferably 0.4–10 mole %, of oxyalkylene units other than the oxymethylene unit. The cyclic ethers or cyclic acetals, the comonomers that yield such an oxyalkylene unit, are expressed by the general formula

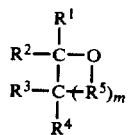

wherein $R^1$, $R^2$, $R^3$ and $R^4$, which may be the same or different, each represent hydrogen, an alkyl group or haloalkyl group, and $R^5$ represents methylene, oxymethylene, or an alkyl- or haloalkyl-substituted methylene or oxymethylene group where m is an integer from 0 to 3, or the group $-(CH_2)_lO-CH_2-$ or $-O-CH_2-(CH_2)_lO-CH_2-$ where m is 1, and l is an integer from 1 to 4. As the foregoing alkyl group, preferred are those of 1 to 5 carbon atoms. On the other hand, as the haloalkyl group, preferred are such an alkyl group substituted by 1 to 3 halogens, especially chlorine.

As the cyclic acetal or cyclic ether, especially convenient are ethylene oxide, glycol formal and diglycol formal. Also usable are, for example, propylene oxide and epichlorohydrin. Further, also usable are the cyclic formals of $\alpha$, $\omega$-diols, such as butanediol formal or hexanediol formal. The copolymers of ethylene oxide and/or 1,3-dioxepane with trioxane are especially used with convenience in the process of this invention, since they give polymers of especially superior thermal stability.

The content of the instable portions of the crude oxymethylene copolymer to be decomposed and eliminated by application of the heat stabilizing treatment in accordance with the process of this invention can be determined from the base stability ($S_{160}^{120}$) and the decomposition ratio ($D_{220}^{60}$). The base stability is determined in the following manner. A crude oxymethylene copolymer is dissolved by heating at 160° C. for 2 hours in benzyl alcohol containing 1% by volume of butylamine. The solution is then allowed to cool. The precipitated copolymer is washed in acetone and dried. The ratio of recovery (wt.%) calculated from the weight of the dried copolymer is designated the base stability. On the other hand, the decomposition ratio ($D_{220}^{60}$) is the decomposition ratio (wt.%) obtained when a crude oxymethylene copolymer is heated at 220° C. for 60 minutes under a vacuum of 2–3 mm Hg. These values well represent the yield of the polymer in the heat-treating stabilizing step.

The heat stabilizing process of this invention is suited for the treatment of the crude oxymethylene copolymers having a base stability ($S_{160}^{120}$) of at least 85% and a decomposition ratio ($D_{220}^{60}$) of not more than 15%. In the case of a crude copolymer containing a greater amount of instable portions than this, a heat treatment of 60 minutes or more is usually required. Hence, when it is desired to heat stabilize a crude oxymethylene copolymer of this kind, the maximum residence time in the degassing apparatus becomes longer than 60 minutes. When the copolymer is subjected to such a harsh heat treatment, a reduction in the molecular weight takes place as a result of the main chain being cleaved. Hence, it is impossible to obtain a satisfactory product.

The oxymethylene copolymers usable in the process of this invention can be obtained by copolymerizing at least 60 mole% of trioxane and a comonomer of the type exemplified hereinbefore in the presence of a polymerization catalyst at a temperature of 0° to 130° C., preferably 10° to 80° C., for 5 to 60 minutes by the bulk polymerization process or the like while vigorously mixing the monomers with stirring. Copolymerization of a starting mixture free from a solvent and consisting of trioxane and 2 to 10 mole% of ethylene oxide or 1,3-dioxepane gives especially suitable crude oxymethylene copolymers having an $S_{160}^{120}$ of at least 85% and a $D_{220}^{60}$ of not more than 15%. Known cationic polymerization catalysts can be used as the polymerization catalyst. In particular, at least one of the catalysts selected from the group consisting of boron trifluoride, boron trifluoride trihydrate and the coordination compounds of an oxygen or sulfur-containing organic compound with boron trifluoride, either in the gaseous form or as a solution in a suitable organic solvent, is advantageously used. The polymerization catalyst usually remains in the crude oxymethylene copolymer after completion of the polymerization reaction to impair the stability of the copolymer. Some of the coinventors of the present invention previously proposed a process for obtaining a stabilized oxymethylene copolymer without removing the catalyst from the polymerization product by deactivating the catalyst with a tertiary phosphine compound (Japanese Laid-Open Patent Publication No. 36186/77). The heat stabilizing treatment of the present invention can be applied with especial advantage to the crude oxymethylene copolymer obtained in the method described above. Japanese Laid-Open Patent Publication No. 36186/77 is cited as a reference herein. Of course, the crude oxymethylene copolymer from which the catalyst has been removed as by washing from the copolymer obtained after completion of the polymerization reaction can be heat stabilized by the process of this invention.

For obtaining a product having satisfactory thermal stability as a molding material by preventing the cleavage of the main chain of the oxymethylene copolymer, it is indispensable that a heat stabilizer be added in carrying out the heat stabilizing treatment of the crude oxymethylene copolymer in accordance with the process of this invention. While the known compounds can be used as the heat stabilizer, especially convenient are the stabilizers consisting of a combination of (1) a hindered phenol compound, (2) at least one compound selected from the group consisting of the hydroxides, inorganic salts, carboxylates and alkoxides of the alkali metals or alkaline earth metals, and (3) a nitrogen-containing high molecular weight compound or an amine-substituted triazine, as disclosed in an application for a letters patent previously filed by some of the coinventors of the present invention (Japanese Laid-Open Patent Publication Nos. 78256/78 and 18640/81). These patent publications are also cited as references in the present invention.

The following examples will serve to more specifically illustrate the present invention. The intrinsic viscosity, unless otherwise indicated, is measured in p-chlorophenol containing 2% by weight of $\alpha$-pinene at 60° C. (dl/g).

EXAMPLE 1

Production of a crude oxymethylene copolymer by continuous polymerization

As the continuous polymerization apparatus, an apparatus of the following setup was employed. The first-stage polymerization reactor, a mixer, included a long casing provided with a jacket about its periphery and a pair of shafts disposed in the casing, each shaft having fitted thereto ellipitical plates with the end portions of the long axes of the plates capable of cleaning the inside wall surface of the casing as well as the surfaces of the other elliptical plates. The second-stage polymerization reactor, a horizontal stirring apparatus, included a long casing provided with a jacket about its periphery and a pair of shafts disposed in the casing, each shaft having stirring blades suitable for mixing a powder but without self-cleaning ability. The casing of the first-stage reactor had an inside diameter of 50 mm, while that of the second-stage reactor had an inside diameter of 140 mm. A similar type of horizontal stirring apparatus was directly coupled to the second-stage polymerization reactor. This was adapted to continuously mix a crude polymer powder while being injected with a deactivator for the polymerization catalyst.

The first-stage polymerization reactor was charged hourly with 2 kg of trioxane, 50 g of ethylene oxide and 0.18 millimole, per mole of trioxane, of boron trifluoride diethyl etherate, and the copolymerization reaction was carried out while maintaining the polymerization temperature at 80° C. After a residence time of about 6 minutes in the first-stage polymerization reactor, a copolymer powder mixture containing 40% by weight of unreacted monomers was sent to the second-stage polymerization reactor. While maintaining a reaction temperature of 50° C., the copolymer mixture was gently mixed in the second-stage polymerization reactor and conveyed to the discharge opening while completing the polymerization reaction in the meantime. The residence time in the second-stage polymerization reactor was about 40 minutes. The content in the resulting crude copolymer of unreacted trioxane was less than 2% by weight. The crude copolymer powder was immediately sent to the horizontal stirring apparatus for mixing in the polymerization catalyst deactivator, at which triphenylphosphine in an amount of 2 moles per mole of the catalyst used was admixed. Although the operation was carried out continuously for about 300 hours, the resulting crude copolymer had an intrinsic viscosity [$\eta$] of 1.43-1.45 dl/g and was obtained in a yield of 96.5-97.5%.

This crude copolymer was vacuum-dried at 60° C. for 10 hours to remove the unreacted monomers and a trace of the solvent. When the copolymer was measured for its melting point (by DSC), base stability ($S_{160}^{120}$) and decomposition ratio ($D_{220}^{60}$) after drying, they were 162.5° C., 93.5% and 6.8%, respectively.

Stabilization of the crude oxymethylene copolymer

The copolymer obtained above was heat stabilized using a degassing apparatus such as shown in FIGS. 1 and 2, consisting of a 60-mm diameter 2-shaft screw extruder coupled to the feed inlet side of a surface renewing-type mixer. The screw extruder has an L/D=15. Starting at the material feed inlet the L/D=5 zone is the melting zone, followed by an L/D=3 zone, a melting zone having mixing disks for imparting a shearing force, next an L/D=3 zone, a degassing zone provided with a vent, and thereafter at the distal end an L/D=4 zone, a pressure raising zone.

The surface renewing-type mixer B coupled to the extruder A was fitted, as shown in FIG. 4, with eyeglass-type scraping blades. The inside diameter of the mixer casing was 30 cm, and the diameter of the circle described by tip of the eyeglass-type scraping blades was 20 cm. Thirty blades were provided, each shaft having 15 blades. The total effective volume of the mixer B was 60 liters. The amount of the resin packed in the mixer B was regulated so that it would be 20 liters by adjusting the speed of rotation of the feeding screw extruder A and the withdrawal screw extruder.

The crude oxymethylene copolymer was fed to the screw extruder at a rate of 60 kg per hour. The average residence time at the screw extruder was one minute when it was operated at 60 rpm, and the maximum residence time was 2.3 minutes. The resin temperature inside the screw extruder could be regulated to between 165° C. and 245° C. and the $D_M$ value could be controlled to fall within a broad range of 15-97% by weight by controlling the barrel temperature and the rotating speed of the screw extruder. The melted resin was then sent to the surface renewing-type mixer. The average apparent specific gravity of the resin in this mixer was 1.0. Results of a tracer response test showed that the average residence time at this time was 21.5 minutes, and that the J value was 2.5. A change in the speed of rotation of the shafts of the mixer showed hardly any change in this value. The heat stabilization experiment was carried out by varying the J value at various speeds of rotation while maintaining the mixing temperature at 210° C. The J value was calculated by the equation (2). The constant k in this case was 1.8.

The intrinsic viscosity and color tone of the so obtained heat stabilized oxymethylene copolymer were determined. Test specimens were prepared from this copolymer by injection molding and, after aging them for 500 and 1000 hours by placing them in an air-conditioned chamber of 140° C., the specimens were tested for their tensile strength (at yield) and tensile elongation (at rupture). The stabilizers used in all cases were 0.1% of calcium hydroxide, 0.1% of melamine and 0.6% of 2,2'-methylenebis(4-methyl-6-tert-butylphenol).

The results obtained are shown in the Table, from which it is apparent that when the $D_M$ value in the extruder A was reduced to below 30% by weight, the resulting oxymethylene copolymer showed a marked degradation in the aging test, whereas when the $D_M$ value exceeded 90% by weight, not only did the resulting oxymethylene copolymer show a fast degradation in the aging test but its initial tensile elongation was also small. On the other hand, when the operation was carried out with the $D_M$ value ranging from 30 to 90% by weight and the J value in the range of 1-50 cm²/cm³·min, the resulting oxymethylene copolymers had satisfactory properties.

TABLE

| Run | 1 | 2 | 3 | 4 | 5 | 6 | 7 | 8 |
|---|---|---|---|---|---|---|---|---|
| Feeding screw extruder operating conditions | | | | | | | | |
| Shaft rotating speed (rpm) | 30 | 50 | 60 | 120 | 65 | 65 | 65 | 65 |
| Inside resin temperature (°C.) | 173 | 185 | 195 | 245 | 200 | 200 | 200 | 200 |
| $D_M$ value (%) | 25 | 38 | 60 | 97 | 65 | 65 | 65 | 65 |
| Surface renewing-type mixer operating conditions | | | | | | | | |
| Shaft rotating speed (rpm) | 20 | 20 | 20 | 20 | 50 | 70 | 20 | 10 |

TABLE-continued

| Run | 1 | 2 | 3 | 4 | 5 | 6 | 7 | 8 |
| --- | --- | --- | --- | --- | --- | --- | --- | --- |
| J value (cm$^2$/cm$^3$·min) | 5 | 5 | 5 | 5 | 13 | 18 | 5 | 3 |
| Pellet | | | | | | | | |
| Content of instable portions (wt. %) | 0.54 | 0.21 | 0.09 | 0.48 | 0.06 | 0.06 | 0.08 | 0.10 |
| Color tone | pale white | white | white | pale yellow | white | white | white | white |
| Intrinsic viscosity (dl/g) | 1.48 | 1.48 | 1.47 | 1.41 | 1.48 | 1.47 | 1.48 | 1.48 |
| 140° C. hot air aging test | | | | | | | | |
| Tensile strength (g/cm$^2$) (at yield) | | | | | | | | |
| 0 hour | 638 | 635 | 638 | 653 | 635 | 629 | 637 | 632 |
| 500 hours | 647 | 649 | 645 | 659 | 647 | 645 | 643 | 645 |
| 1000 hours | 648 | 648 | 649 | 632 | 647 | 644 | 643 | 640 |
| Tensile elongation (%) (at rupture) | | | | | | | | |
| 0 hour | 50 | 48 | 54 | 21 | 50 | 41 | 47 | 40 |
| 500 hours | 27 | 40 | 41 | 17 | 38 | 29 | 37 | 29 |
| 1000 hours | 7 | 26 | 31 | 8 | 27 | 20 | 25 | 21 |
| Remarks | Comp. ex. | | | Comp. ex. | | | | |

We claim:

1. In a process for producing a stabilized oxymethylene copolymer by heat-melting, at a temperature ranging between the melting point of the copolymer and a temperature 100° C. higher than the melting point in a degassing apparatus in the presence of a heat stabilizer, a crude oxymethylene copolymer of trioxane with a cyclic acetal or cyclic ether, to decompose and eliminate the instable portions of the copolymer, the improvement which comprises using as the degassing apparatus in heat stabilizing the crude oxymethylene copolymer a combination of (A) an extruder and (B) a surface renewing-type mixer, and carrying out the operation by first feeding a crude oxymethylene copolymer to said extruder (A) to heat-melt and decompose 30–90% by weight of the instable portions of the crude copolymer, removing the decomposed gas via a vent provided in said extruder, and thereafter introducing the molten resin continuously to said surface renewing-type mixer (B) where substantially all of the remaining instable portions of the oxymethylene copolymer are heat-decomposed until the content of the instable portions falls below about 2 wt.%, thereby heat stabilizing the copolymer; said extruder (A) having a single or a plurality of shafts, said surface renewing-type mixer (B) comprising a casing having a jacket for a heating medium fitted about its periphery and, disposed inside said casing, at least two stirring shafts each fitted with a plurality of scraping blades, said scraping blades being fitted to the shafts in staggered relationship to ensure that the blades do not collide with one another when the shafts are rotated in the same or different directions, whereby said blades rotate while maintaining a slight clearance between their tips and the inside surface of the casing and the surface of the other stirring shaft, or said scraping blades being fitted to the several shafts being so disposed as to be in the same plane right-angled to the axial direction and so that they rotate while maintaining a slight clearance between the tips of the blades and the inside surface of the casing and the surface of the other corresponding blade when said shafts are rotated in the same or different directions, whereby said surface renewing-type mixer functions to mix and knead the resin thereby constantly renewing the surface of the resin to volatize the volatiles contained therein.

2. The process as defined in claim 1 wherein the average residence time of the oxymethylene copolymer in the degassing apparatus as a whole is from 5 to 60 minutes, and the treatment is carried out under a pressure ranging between 760 mm and 0.1 mm of mercury.

3. The process as defined in claim 1 wherein the surface of the melt of the oxymethylene copolymer is renewed in the surface renewing-type mixer to such a degree that the surface renewing coefficient J as defined by the equation (1) is in the range of 1–50 cm$^2$/cm$^3$·min.

$$J = \frac{N \times As}{H} \quad (1)$$

wherein

N is the speed of rotation of the shafts (rpm), As is the surface area of the surface renewing portion (cm$^2$), and H is the amount of resin packed at the surface renewing portion (cm$^3$).

4. The process as defined in claim 1 wherein the ratio of the maximum residence time t to the average residence time $t_o$ in the degassing apparatus is no greater than 3.0.

5. The process of any one of claims 1 to 4 wherein the crude oxymethylene copolymer to be heat stabilized is a copolymer having a base stability ($S_{160}^{120}$) of at least 85% and a decomposition ratio ($D_{220}^{60}$) of not greater than 15%.

* * * * *